US011456794B2

(12) United States Patent
Hu et al.

(10) Patent No.: US 11,456,794 B2
(45) Date of Patent: Sep. 27, 2022

(54) HANDLING FAILURE OF A SUBSET OF SERVING BEAM PAIR LINKS

(71) Applicant: HUAWEI TECHNOLOGIES CO., LTD., Shenzhen (CN)

(72) Inventors: Wenquan Hu, Lund (SE); Bengt Lindoff, Kista (SE); Neng Wang, Lund (SE); Stefan Recknagel, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 2 days.

(21) Appl. No.: 16/919,194

(22) Filed: Jul. 2, 2020

(65) Prior Publication Data

US 2020/0336195 A1    Oct. 22, 2020

Related U.S. Application Data

(63) Continuation of application No. PCT/EP2018/050216, filed on Jan. 4, 2018.

(51) Int. Cl.
*H04B 7/06* (2006.01)
*H04B 7/0408* (2017.01)
(Continued)

(52) U.S. Cl.
CPC ......... *H04B 7/0695* (2013.01); *H04B 7/0408* (2013.01); *H04B 7/088* (2013.01);
(Continued)

(58) Field of Classification Search
CPC .... H04B 7/0695; H04B 7/0408; H04B 7/088; H04B 7/0617; H04W 24/08; H04W 74/02;
(Continued)

(56) References Cited

U.S. PATENT DOCUMENTS

2018/0227899 A1* 8/2018 Yu .................... H04B 7/0695
2018/0302889 A1* 10/2018 Guo .................... H04B 7/088
(Continued)

FOREIGN PATENT DOCUMENTS

CN    105052199 A    11/2015
CN    107079459 A    8/2017
(Continued)

OTHER PUBLICATIONS

ZTE et al: "Discussion on beam recovery", 3GPP TSG RAN WG1 Meeting NR#3; R1-1715441, Sep. 18-21, 2017, 9 pages.
(Continued)

*Primary Examiner* — Lan N Moore
*Assistant Examiner* — Latresa A McCallum
(74) *Attorney, Agent, or Firm* — Maier & Maier, PLLC

(57) ABSTRACT

It is an object to provide a procedure for handling failure of a subset of serving beam pair links in wireless radio communication. A client device is configured to monitor, independently, a link quality of each serving downlink (DL) beam pair link (BPL) of the client device; detect at least one failed DL BPL based on the monitoring, where the at least one failed DL BPL is a subset of the monitored serving DL BPLs; choose an uplink, UL, BPL, where the chosen UL BPL corresponds to an available serving DL BPL of the monitored serving DL BPLs; and transmit a beam report within a predetermined time period from the detection through a non-contention-based channel using the chosen UL BPL, where the beam report indicates the at least one failed DL BPL. A client device, a network device, methods and a computer program are included.

17 Claims, 4 Drawing Sheets

(51) Int. Cl.
*H04B 7/08* (2006.01)
*H04W 24/08* (2009.01)
*H04W 74/02* (2009.01)
*H04W 74/08* (2009.01)

(52) U.S. Cl.
CPC .......... *H04W 24/08* (2013.01); *H04W 74/02* (2013.01); *H04W 74/0833* (2013.01)

(58) Field of Classification Search
CPC .................. H04W 74/0833; H04W 16/18; H04L 41/145; H04L 43/00
See application file for complete search history.

(56) References Cited

U.S. PATENT DOCUMENTS

2019/0007906 A1* 1/2019 Hessler ............. H04W 52/0245
2020/0373990 A1* 11/2020 Da Silva ........... H04W 74/0833

FOREIGN PATENT DOCUMENTS

| CN | 107342801 A | 11/2017 | | |
|---|---|---|---|---|
| CN | 107534466 A | 1/2018 | | |
| WO | 2017196612 A1 | 11/2017 | | |
| WO | 2017217898 A1 | 12/2017 | | |
| WO | WO-2018083624 A1 * | 5/2018 | ............. | H04B 7/022 |

OTHER PUBLICATIONS

Huawei et al: "Beam Failure Recovery Design Details", 3GPP TSG RAN WG1 Meeting AH NR#3; R1-1715468, Sep. 18-21, 2017, 10 pages.

IEEE Std 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, 2016, 3534 pages total.

MediaTek Inc.: "Offline Summary for Remaing issues on Beam Failure Recovery", 3GPP TSG RAN WG1 Meeting #91, R1-1721549, Nov. 27-Dec. 1, 2017, 19 pages.

Qualcomm Incorporated: "Beam recovery procedure", 3GPP TSG RAN WG1 Meeting NR#3, R1-1716397, Sep. 18-21, 2017, 7 pages.

* cited by examiner

| 500 | 501 | 502 | 503 |
| --- | --- | --- | --- |
| | BPL ID | Network Tx | Client Rx |
| | 1 | Tx 4 | Rx 1 |
| | 2 | Tx 2 | Rx 2 |
| | 3 | Tx 7 | Rx 3 |
| | 4 | Tx 1 | Rx 4 |
FIG. 5
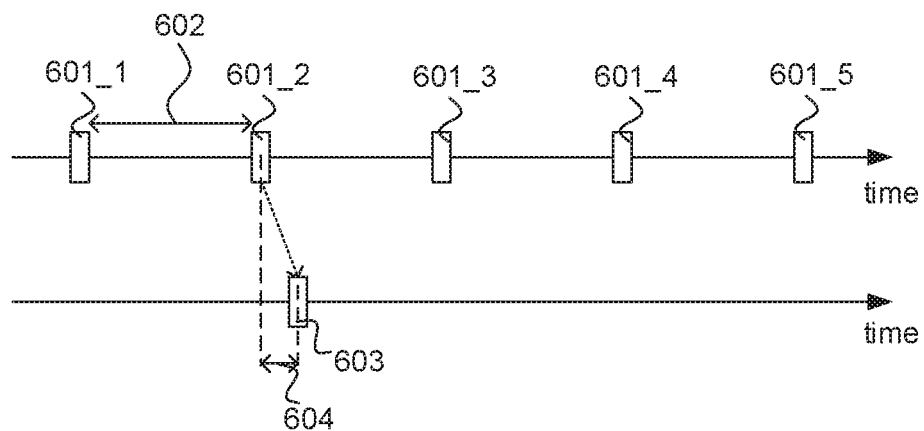
FIG. 6
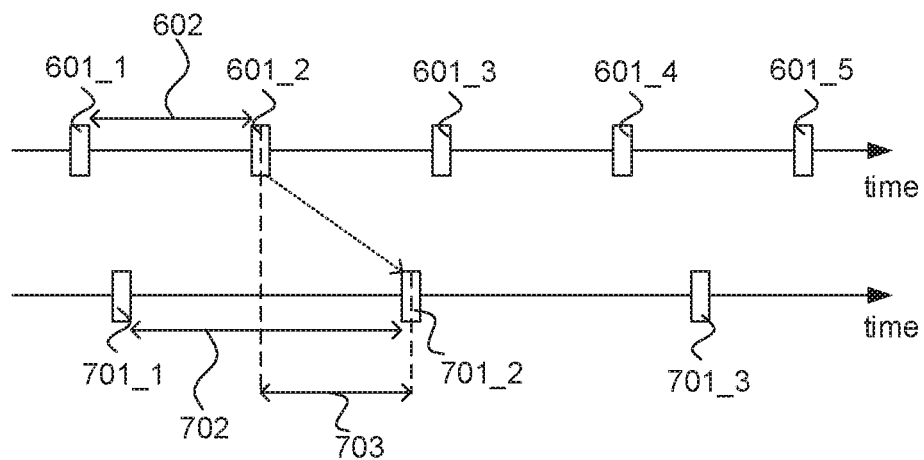
FIG. 7

| BPL ID | RSRP |
|---|---|
| 1 | RSRP 1 |
| 2 | -1 |
| 3 | RSRP 3 |
| 4 | RSRP 4 |

FIG. 8

| BPL ID | RSRP |
|---|---|
| 1 | RSRP 1 |
| 3 | RSRP 3 |
| 4 | RSRP 4 |

FIG. 9

HANDLING FAILURE OF A SUBSET OF SERVING BEAM PAIR LINKS

CROSS-REFERENCE TO RELATED APPLICATIONS

This application is a continuation of International Application No. PCT/EP2018/050216, filed on Jan. 4, 2018, the disclosure of which is hereby incorporated by reference in its entirety.

TECHNICAL FIELD

The embodiments relate to the field of wireless radio communications, and more particularly to a client device, a network device, and management of failed beam pair links. Furthermore, the disclosure relates to corresponding methods and a computer program.

BACKGROUND

In modern radio communication, a client device, such as a mobile phone, may be connected to a network device, such as a base station (gNB), using multiple beam pair link (BPLs). An uplink (UL) BPL may include a transmitting (Tx) beam in the client device and a receiving (Rx) beam in the network device. A downlink (DL) BPL may include a receiving (Rx) beam in the client device and a transmitting (Tx) beam in the network device. A serving BPL may fail, for example, when a physical object obstructs the link. If the client device or the network device transmits signals using a failed BPL, radio and power resources may be wasted. Furthermore, if all DL BPLs of a client device fail, the client device should use a beam failure recovery procedure to re-establish the DL BPLs, which may consume even more resources and cause link interruptions.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object to provide a procedure for handling failure of a subset of serving beam pair links in wireless radio communication.

According to a first aspect, a client device is configured to monitor, independently, a link quality of each serving downlink (DL) beam pair link (BPL) of the client device; detect at least one failed DL BPL based on the monitoring, where the at least one failed DL BPL is a subset of the monitored serving DL BPLs; choose an uplink (UL) BPL, where the chosen UL BPL corresponds to an available serving DL BPL of the monitored serving DL BPLs; and transmit a beam report within a predetermined time period from the detection through a non-contention-based channel using the chosen UL BPL, where the beam report indicates the at least one failed DL BPL. For example, by these configurations, the client device may save radio and power resources and reduce link interruptions.

In a further implementation form of the first aspect, the chosen UL BPL is a currently applied UL BPL corresponding to a currently applied DL BPL for transmitting a DL control channel, where the DL BPL is one of the monitored serving DL BPLs. The DL BPL and the corresponding UL BPL may be the activated BPLs which are being applied to transmit the DL control channel and the UL control channel, respectively. The activated BPL being applied to transmit the control channel is convenient to use to send the beam report. The beam report may be transmitted efficiently, when the currently applied, for example the activated UL BPL which may be the most robust, is used.

In a further implementation form of the first aspect, the chosen UL BPL corresponds to a first available DL BPL of the monitored serving DL BPLs. For example, UL BPL choice is made easier, which may reduce needed computations. These configurations may save radio and power resources and reduce link interruptions.

In a further implementation form of the first aspect, the chosen UL BPL corresponds to a DL BPL having a predefined relationship to the failed DL BPL. For example, a fixed sequence, e.g., by a physical random access channel (PRACH), can be used as the beam report.

In a further implementation form of the first aspect, the beam report is free of an explicit indication of the at least one failed DL BPL. For example, this may reduce the length of the beam report.

In a further implementation form of the first aspect, the beam report includes an identification of the at least one failed DL BPL. For example, computation for deducing the failed DL BPL may be reduced.

In a further implementation form of the first aspect, the beam report includes a bitmap, where the bitmap indicates the at least one failed DL BPL. For example, the failed DL BPL can be indicated with a low number of bits.

In a further implementation form of the first aspect, the beam report indicates the at least one failed DL BPL using a specific reference signal received power value. For example, the failed DL BPL can be indicated while transmitting useful information about other DL BPLs.

In a further implementation form of the first aspect, the client device is further configured to transmit the beam report when a number of consecutive failures of the at least one failed DL BPL surpasses a predetermined threshold. For example, a DL BPL may not be declared as failed unnecessarily.

In a further implementation form of the first aspect, the client device is further configured to exclude the at least one failed DL BPL from the beam report. For example, useful information can be transmitted about other DL BPLs while the message length may be reduced.

In a further implementation form of the first aspect, the client device is further configured to transmit the beam report quasi-instantly as a response to detecting the at least one failed DL BPL. For example, indication about the failed DL BPL is transmitted quickly to the network device.

In a further implementation form of the first aspect, the client device is further configured to transmit the beam report periodically according to a network configuration. For example, indication of the failed DL BPLs does not require additional messages.

In a further implementation form of the first aspect, the non-contention-based channel includes a PRACH, a physical uplink control channel (PUCCH), or a physical uplink shared channel (PUSCH). For example, the beam report can be transmitted efficiently.

In a further implementation form of the first aspect, the client device is further configured to perform the monitoring by measuring reference signals that are quasi-co-located with the respective BPLs to assess the link quality according to each resource configuration against a configured high layer threshold. For example, the monitoring can be configured using high layer signalling.

In a further implementation form of the first aspect, the client device is further configured to remove the at least one failed DL BPL from a list of the serving DL BPLs. By this, the list is kept up to date for efficient utilisation of the serving DL BPLs.

According to a second aspect, a network device is configured to receive a beam report from a client device through a non-contention-based channel, where the beam report indicates at least one failed DL BPL of monitored serving DL BPLs, where the at least one failed DL BPL includes a subset of the monitored serving DL BPLs; and remove the at least one failed DL BPL from a list, where the list includes serving DL BPLs of the client device. For example, the network device can keep track of the serving DL BPLs of the client device. These configurations may save radio and power resources and reduce link interruptions.

According to a third aspect, a method includes independently monitoring a link quality of each serving DL BPL of a client device; detecting at least one failed DL BPL based on the monitoring, where the at least one failed DL BPL is a subset of the monitored serving DL BPLs; choosing an UL BPL, where the chosen UL BPL corresponds to an available serving DL BPL of the monitored serving DL BPLs; and transmitting a beam report within a predetermined time period from the detection through a non-contention-based channel using the chosen UL BPL, where the beam report indicates the at least one failed DL BPL. These procedures may save radio and power resources and reduce link interruptions.

According to a fourth aspect, a method includes receiving a beam report from a client device through a non-contention-based channel, where the beam report indicates at least one failed DL, BPL of monitored serving DL BPLs, where the at least one failed DL BPL includes a subset of the monitored serving DL BPLs; and removing the at least one failed DL BPL from a list, where the list includes serving DL BPLs of the client device. These procedures may save radio and power resources and reduce link interruptions.

According to the fifth aspect, a computer program is provided, including program code configured to perform a method according to the third aspect or the fourth aspect when the computer program is executed on a computer.

Many of the attendant features will be more readily appreciated as they become better understood by reference to the following description considered in connection with the accompanying drawings.

DESCRIPTION OF THE DRAWINGS

The present description will be better understood from the following description read in light of the accompanying drawings, where:

FIG. 5 illustrates a schematic representation of a table of beam pair links according to an embodiment;

FIG. 6 illustrates a schematic representation of a beam report procedure according to an embodiment;

FIG. 7 illustrates a schematic representation of a beam report procedure according to another embodiment;

FIG. 8 illustrates a schematic representation of a table of reference signal received power values according to an embodiment; and FIG. 9 illustrates a schematic representation of a table of reference signal received power values according to another embodiment.

Like references are used to designate like parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

According to an embodiment, a client device is configured to monitor independently the link quality of each serving downlink (DL) beam pair link (BPL) of the client device. Based on the monitoring, where the client device may be configured to perform the monitoring by measuring reference signals that is quasi-co-located with the respective BPL, the client device can detect at least one failed DL BPL, where the at least one failed DL BPL is a subset of the monitored serving DL BPLs. The client device can choose an uplink (UL) BPL, where the chosen UL BPL corresponds to an available serving DL BPL of the monitored serving DL BPLs. Using the chosen UL BPL, the client device can transmit a beam report to a network device through a non-contention-based channel within a predetermined time period from the detection of the at least one failed DL BPL. The client device may detect failure of individual DL BPLs. The beam report indicates which of the serving DL BPLs have failed. Since the network device is informed about the failed DL BPLs, it does not unnecessarily transmit messages using the failed DL BPLs, which saves radio and power resources. Furthermore, if the rest of the serving DL BPLs fail, the client device may need to initiate a beam failure recovery procedure, which may consume even more resources and cause link interruptions. This situation may be circumvented or avoided, because the client device can efficiently indicate failed DL BPLs when a subset of the serving DL BPLs fail and accordingly appropriate countermeasures can have been started already before the full set of serving DL BPLs fail.

According to an embodiment, the network device is configured to receive a beam report from the client device through a non-contention-based channel. The beam report indicates at least one failed DL BPL of monitored serving DL BPLs, where the at least one failed DL BPL includes a subset of the monitored serving DL BPLs. The network device is further configured to remove the at least one failed DL BPL from the list of serving DL BPLs of the client device. This allows the network device to keep track of the serving DL BPLs of the client device, and optionally assign new serving DL BPLs to the client device.

Figure 1:
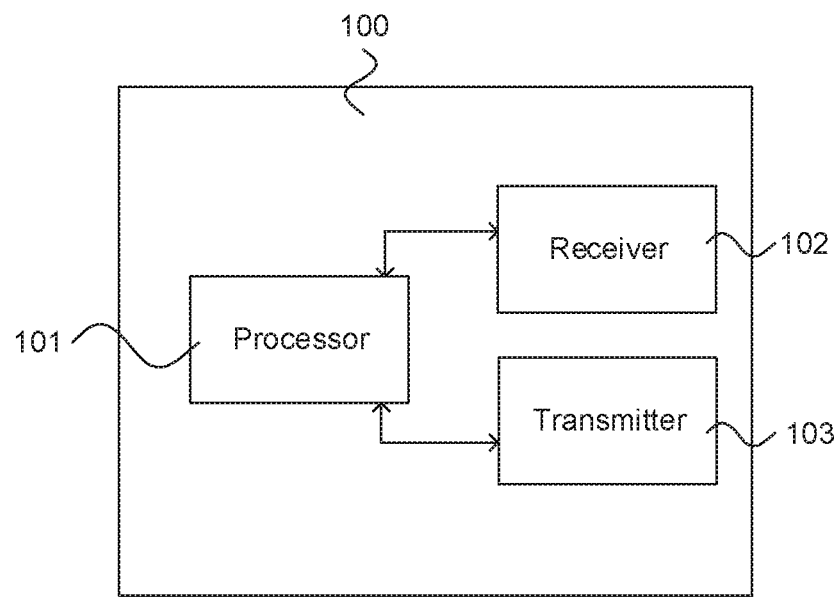
FIG. 1 illustrates a schematic representation of a client device configured to handle failure of a subset of serving beam pair links according to an embodiment.
Figure 2:
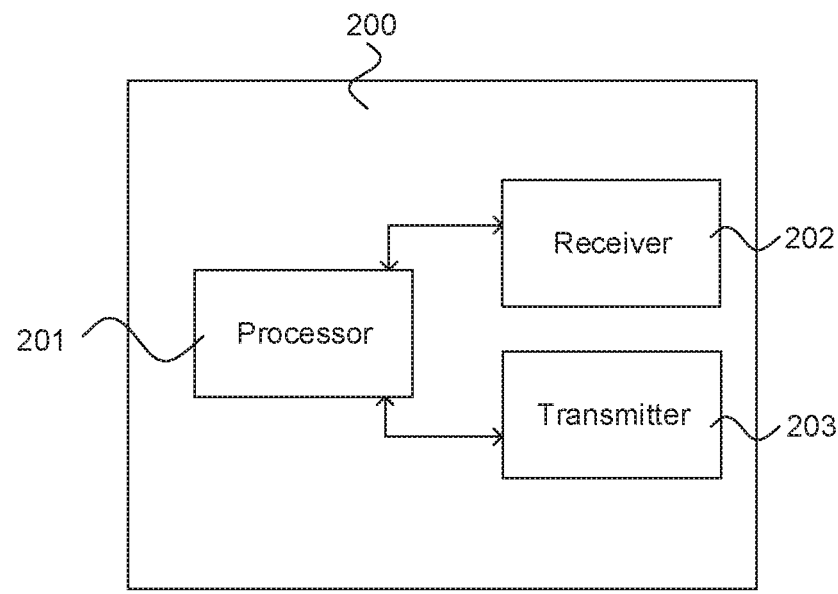
FIG. 2 illustrates a schematic representation of a network device configured to handle failure of a subset of serving beam pair links according to an embodiment.

FIGS. 1 and 2 schematically illustrate a client device 100, such as a wireless device, in a wireless communication system. The client device 100 includes a processor 101, a receiver 102 and a transmitter 103. The client device 100 may be configured to perform the functionalities and operations relating to it as described in the embodiments. The wireless communication system also includes a network device 200, such as a transmission and reception point (TRP) or a 5G base station (gNB), which may also include a processor 201, a receiver 202 and a transmitter 203. The network device 200 may also be configured to perform the functionalities and operations relating the network device 200 as described in the embodiments.

The client device 100 may be any of a user equipment (UE) in long term evolution (LTE), or new radio access technology (NR), mobile station (MS), wireless terminal or mobile terminal which is enabled to communicate wirelessly in a wireless communication system, sometimes also referred to as a cellular radio system. The client device 100 may further be referred to as mobile telephone, cellular telephone, computer tablet or laptop with wireless capability. The client device 100 may be, for example, a portable, pocket-storable, hand-held, computer-comprised, or vehicle-mounted mobile device, enabled to communicate voice or data, via a radio access network, with another entity, such as another receiver or a server. The client device 100 can be a station (STA) which is any device that contains an IEEE 802.11-conformant media access control (MAC) and physical layer (PHY) interface to the wireless medium (WM).

The network device 200 may be a transmission or reception point (TRP) or a gNB. The network device 200 may be a base station, a (radio) network node or an access node or an access point or a base station, e.g., a radio base station (RBS), which in some networks may be referred to as a transmitter, "eNB", "eNodeB", "gNB", "gNodeB", "NodeB", or "B node", depending on the technology and terminology used. The radio network nodes may be of different classes such as, e.g., macro eNodeB, home eNodeB or pico base station, based on transmission power and thereby also cell size. The radio network node can be a STA which is any device that contains an IEEE 802.11-conformant MAC and PHY interface to the WM.

Figure 3:
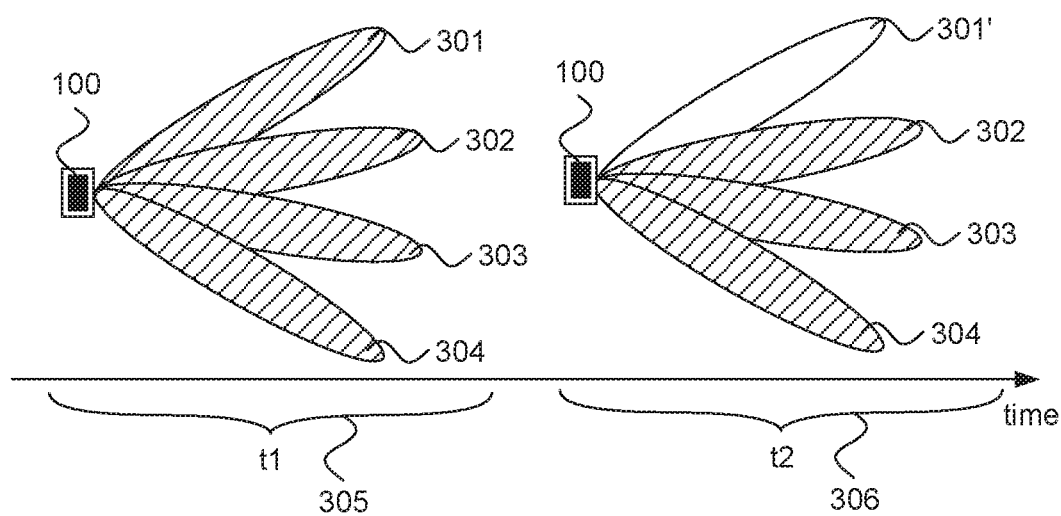
FIG. 3 illustrates a schematic representation of beam of a client device according to an embodiment.

FIG. 3 illustrates a schematic representation of a client device 100 and multiple beams 301-304 formed by the client device 100 according to an embodiment. The client device 100 may form the beams using, for example, an array of antennas. By adjusting the phase and amplitude of electrical currents, for example by complex weights, fed into the antennas of the antenna array, the client device 100 may modify the shape and direction of the beams 301-304. Each beam may be a receiving (Rx) or a transmitting (Tx) beam. The client device 100 may use the beams 301-304 to communicate with other devices, such as a network device 200. The network device 200 may be, for example, a gNB. For each Tx beam in the client device 100, there may be an Rx beam in the network device 200 and vice versa. In such a case, the connected Tx/Rx beams form a BPL. Some subset of configured BPLs may be configured as serving BPLs, and a serving BPL may be configured as a serving BPL for a data channel or for a control channel A BPL is a DL BPL if signals, such as physical downlink control channels, reference signals (CSI-RS, SSB, TRS etc.) or physical downlink data channels, are transmitted from the network device 200 to the client device 100. A BPL is a UL BPL if signals, such as physical uplink control channels, reference signals (SRS, PT-RS etc.) or physical uplink data channels, are transmitted from the client device 100 to the network device 200.

In the embodiments, the transmit beam and receive beam may be used for describing the direction of transmission of signals and direction of reception of signals, respectively, for a client device 100 or network device 200. For example, a specific beam can be interpreted as a certain spatial transmitter or receiver parameter setting or spatial filtering determined in the processing device of such client device 100 or network device 200. These settings or parameters may, for instance, be outputted from the processing device and used in the client device/network device radio transceiver configuration for directing the transmission of signals or reception of signals in a certain direction. A receive beam may correspond to a certain spatial domain (receive) filter configuration. A transmit beam may correspond to a certain antenna port or spatial layer.

Each DL BPL may be associated with an UL BPL. The UL BPL and DL BPL may be spatially quasi-co-located (QCLed) with each other. In such a case, the transmission properties of the link may be considered to be practically identical for both the DL BPL and the UL BPL. This may also be referred to as correspondence between the DL BPL and the UL BPL. Even without such correspondence, a DL BPL and an UL BPL may be associated so that when the client device 100 is scheduled on the DL BPL, the associated UL BPL can be used for UL transmission. Herein, both of these cases may be referred to as correspondence between a UL BPL and a DL BPL. Furthermore, physical channels and reference signals may further be QCLed with a respective BPL, meaning they are transmitted in the corresponding beam.

Some DL BPL between the client device 100 and the network device 200 may fail at some point in time. The failure of a DL BPL may occur, for example, when some object physically obstructs the link or if the client device 100 moves. This type of situation is illustrated in FIG. 3, according to an embodiment. At some time t1 305, all of the beams 301-304 are active and functioning, but at some later time t2 306, the DL BPL of beam 301 has failed as illustrated by the beam 301'. This situation may be referred to as partial DL BPL loss, because the serving DL BPLs of beams 302-304 are still functional at time t2 306. Generally, if a subset of all serving DL BPLs fails, the situation may be referred to as partial DL BPL loss. If the network device 200 transmits a message to the client device 100 using the failed DL BPL of beam 301', the client device 100 may not be able to receive the message. Thus, radio, such as time-frequency, and power resources may be wasted. Furthermore, if the rest of the DLs BPLs of beams 302-304 fail, the client device 100 may need to initiate a beam failure recovery procedure, which may consume even more resources and cause link interruptions. Therefore, it may be beneficial for the client device 100 to be able to report to the network device 200 about the failed DL BPL of beam 301'.

Although the embodiment of FIG. 3 illustrates a failure of one beam 301', multiple beams 301' of the serving beams 302-304 may fail. Because there are still serving DL BPLs 302-304, the failed beams 301' are the subset as described above. The client device 100 and the network device 200 may handle the failure of the subset as described in the embodiments.

Figure 4:
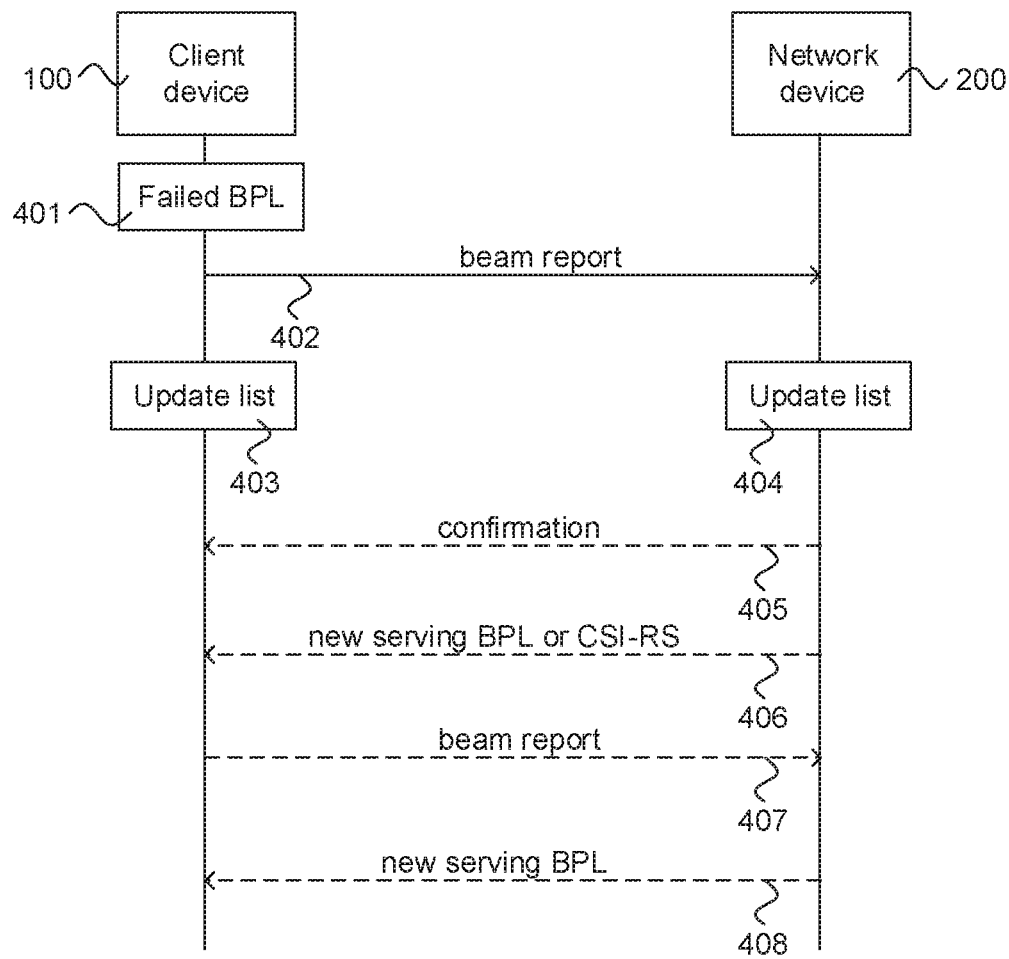
FIG. 4 illustrates a schematic representation of signalling diagram for handling failure of a subset of serving beam pair links between a client device and a network device according to an embodiment.

FIG. 4 illustrates a schematic representation of a beam report process according to an embodiment. The operations and signaling of the embodiment of FIG. 4 may be performed by the client device 100 and the network device 200 for their respective configurations.

In operation 401, the client device 100 detects that a serving DL BPL or a subset of serving DL BPLs have failed. In operation 402, the client device 100 transmits a beam report to the network device 200. The beam report may be transmitted using a non-contention-based channel, such as a physical random access channel (PRACH), a physical uplink control channel (PUCCH), or a physical uplink shared channel (PUSCH). The beam report indicates which serving DL BPL(s) have failed. The indication can be explicit or implicit as described later. In the operation 403, the client device 100 updates a list of serving DL BPLs by, for example, deleting the failed DL BPL or DL BPLs from the list. In the operation 404, after receiving the beam report, the network device 200, updates a corresponding list that includes serving DL BPLs of the client device 100. Alternatively, or in addition to this, in operation 405, the network device 200 may confirm the update by indicating the updated list to the client device 100 or by transmitting an acknowledgement message to the client device 100.

After the client device 100 and the network device 200 have updated their respective DL BPL lists, the network device 200 may choose to add more entries into the serving DL BPL pool. The network device 200 may indicate the client device 100 a new serving DL BPL from configured beams in operation 406. Alternatively, the network device 200 may schedule an aperiodic channel state information reference signals (CSI-RSs) for the client device 100 to establish a new serving DL BPL or DL BPLs to replace the failed DL BPL or DL BPLs. The CSI-RSs may not be QCLed with any of the previous BPLs, which may save CRI-RS resources. In operation 407, the client device may transmit a new beam report as a response to the aperiodic CSI-RSs. The network device 200 may use the new beam report to choose new serving DL BPLs and indicate these to the client device 100 in operation 408. Alternatively, the network device 200 may indicate an updated serving DL BPL list to the client device 100. It may be understood that the operations 405-408 may be optional as indicated in FIG. 4, and operations 406-408 may not be needed if new DL BPLs are not assigned for the client device 100.

FIG. 5 illustrates a schematic representation of a table 500 of DL BPLs according to an embodiment. Each row of the table 500 corresponds to a serving DL BPL. Each BPL may be assigned an identification, ID, 501. Furthermore, each row indicates the Tx beam 502 in the network device 200 and the Rx beam 503 in the client device that form the serving DL BPL. It may be understood that all of the values and the number of BPLs in the table 500 are only exemplary. Transmission configuration indication (TCI), for example, may be used for the IDs 501. Both the client device 100 and the network device 200 may include a table similar to the table 500, which they may use to keep track of the DL BPLs. Furthermore, the network device 200 may include multiple such tables, one for each client device 100 connected to the network device 200. The client device 100 may also include multiple tables 500, if the client device 100 is, for example, connected to multiple network devices 200.

FIG. 6 illustrates a schematic representation of a beam report procedure according to an embodiment. The client device 100 performs measurements 601_1-601_5 to independently assess the link quality of each serving DL BPL. The client device 100 may perform the measurements 601_1-601_5 periodically as indicated by the time interval 602. Alternatively, the measurements 601_1-601_5 may be aperiodic. The client device 100 may, for example, measure reference signals, RSs QCLed with respective DL BPL, and based on the measurement results, the client device 100 can deduce a hypothetical physical downlink control channel, PDCCH for the PDCCH also QCLed with the corresponding RS and DL BPL, block error rate (BLER) for each serving DL BPL. Alternatively, or in addition to this, the client device 100 may measure reference signal received power (RSRP) for each link. The RSs may be transmitted by a serving DL beam or by a non-serving DL beam. The measurement results may be compared to a predetermined threshold value, and if the measured value is worse than the threshold, the DL BPL may be considered as failed. Alternatively, a DL BPL may be considered failed if multiple consecutive measurement results are worse than a predetermined threshold. The number of such consecutive measurements required for a DL BPL to be declared as failed can be configured either by the client device 100, via a pre-defined rule, for example a standard, or via a configuration message transmitted by the network device 200. The measurements 601_1-601_5 may also be referred to as monitoring of the link quality.

In the example scenario of FIG. 6, a failed DL BPL has been detected in measurement 601_2. Due to this, the client device 100 transmits a beam report 603 to the network device 200, and the beam report 603 indicates which DL BPL has failed. The client device 100 may transmit the beam report 603 within the predetermined time period 604. For example, the client device 100 may transmit the beam report 603 quasi-instantly with respect to the measurement 601_2. According to an embodiment, this may be that the time delay between the measurement 601_2 and the beam report 603 is insignificant compared to, for example, the time interval 602. Alternatively, or in addition to this, the time delay 604 may be configured by the client device 100 or by the network device 200. The beam report 603 can explicitly indicate the failed DL BPL by, for example, including the ID of the failed DL BPL. Multiple failed DL BPLs may also be detected in the same measurement. In such a case, the beam report 603 may include the IDs of all of the failed DL BPLs as a list. For example, {TCI [01]} indicating the failure of DL BPL 01. Alternatively, the beam report 603 may include a bitmap, and the bitmap may indicate the failed DL BPLs. For example, if the second DL BPL out of four DL BPLs has failed, the bitmap may be {0100}. This may indicate the failure of TCI [01]; the serving DL BPLs being TCI [00], TCI [10], [TCI 11], etc.

The client device 100 may use any available UL BPL to transmit the beam report to the network device 200. For example, the client device 100 may use the currently applied UL BPL corresponding to the currently applied DL BPL for transmitting a DL control channel. The DL BPL and the corresponding UL BPL may be the activated BPLs which are being applied to transmit the DL control channel and the UL control channel, respectively. For another example, the client device 100 may use the UL BPL that is corresponding to the most robust DL BPL. This most robust DL BPL maybe the activated BPL used for transmitting the DL control channel. The corresponding UL BPL may be referred to as an anchor UL BPL. The activated/most robust DL BPL may be deduced, for example, based on the measurements 601_1-601_5. Alternatively or additionally, the client device 100 may use the UL BPL that corresponds to the first available DL BPL. For example, if the DL BPL with ID 2 in FIG. 5 fails, the client device 100 may use the UL BPL corresponding to the DL BPL with ID 1. Furthermore, the client device may use the UL BPL corresponding to next available BPL where there is a one to one mapping between DL BPL and UL BPL.

The indication of the failed DL BPL in the beam report 603 can also be implicit. For example, the client device 100 can transmit the beam report using the UL BPL that is associated with a DL BPL that is next from the failed DL BPL with respect to indexing of the IDs. For example, if the DL BPL with ID 3 in FIG. 5 fails, the client device 100 may transmit the beam report with the UL BPL that is associated with DL BPL with ID 4. Thus, the network device 200 can deduce which DL BPL has failed based on the UL BPL that was used to transmit the beam report. Alternatively or additionally, some other scheme may be used where the UL BPL used for transmitting the beam report and the failed DL BPL have a predefined relationship. For example, this relationship should be agreed upon by the client device 100 and the network device 200. When this type of scheme is used, the beam report may be a fixed sequence, for example, using a PRACH, because the beam report can be free of an explicit indication of the failed DL BPL.

FIG. 7 illustrates a schematic representation of a beam report procedure according to another embodiment. The measurements 601_1-601_5 may be similar to those presented in FIG. 6. The client device 100 may transmit the beam report 603 within the predetermined time period 703. In the embodiment of FIG. 7, the beam reports 701_1-701_3 are transmitted periodically, as indicated by the time interval 702. Thus, there may be some delay 703 between detecting a failed DL BPL 601_2 and transmitting a beam report 701_2 that indicates that the DL BPL has failed. The time interval 702 may be defined, for example, by a network configuration. It can be understood that since the time interval 702 is the periodicity of the beam reports 701_1-701_3, the time interval 702 also determines an upper bound for the delay 703. For example, if a failed DL BPL is detected immediately after beam report 701_1 is transmitted, beam report 701_2 include indication about the failed DL BPL. In such a case, the delay 703 may be equal to the time interval 702. Otherwise, if the failed DL BPL is detected between the beam reports 701_1-701_2, the delay 703 may be shorter than the time interval 702. Both beam report schemes of FIGS. 6 and 7 may be implemented in the same wireless communication system, and for example, the network device 200 may be configured to choose between the schemes.

Since the client device 100 does not transmit the beam reports 701_1-701_3 as a response to detecting a failed DL BPL, all of the beam reports 701_1-701_3 do not necessarily indicate a failed DL BPL. For example, in the example scenario of FIG. 7, a failed DL BPL is only detected in measurement 601_2. Therefore, the failed DL BPL may only be reported in beam report 701_2. The failed DL BPL may be indicated in the beam report 701_2 using the procedures described above. In such a case, beam reports that do not indicate a failed DL BPL, 701_1 and 701_3, may be empty. Alternatively or in addition to this, all of the beam reports 701_1-701_3 may include information about the DL BPLs and additionally indicate a failed BPL, if a failed BPL has been detected.

Figures 8, 9:
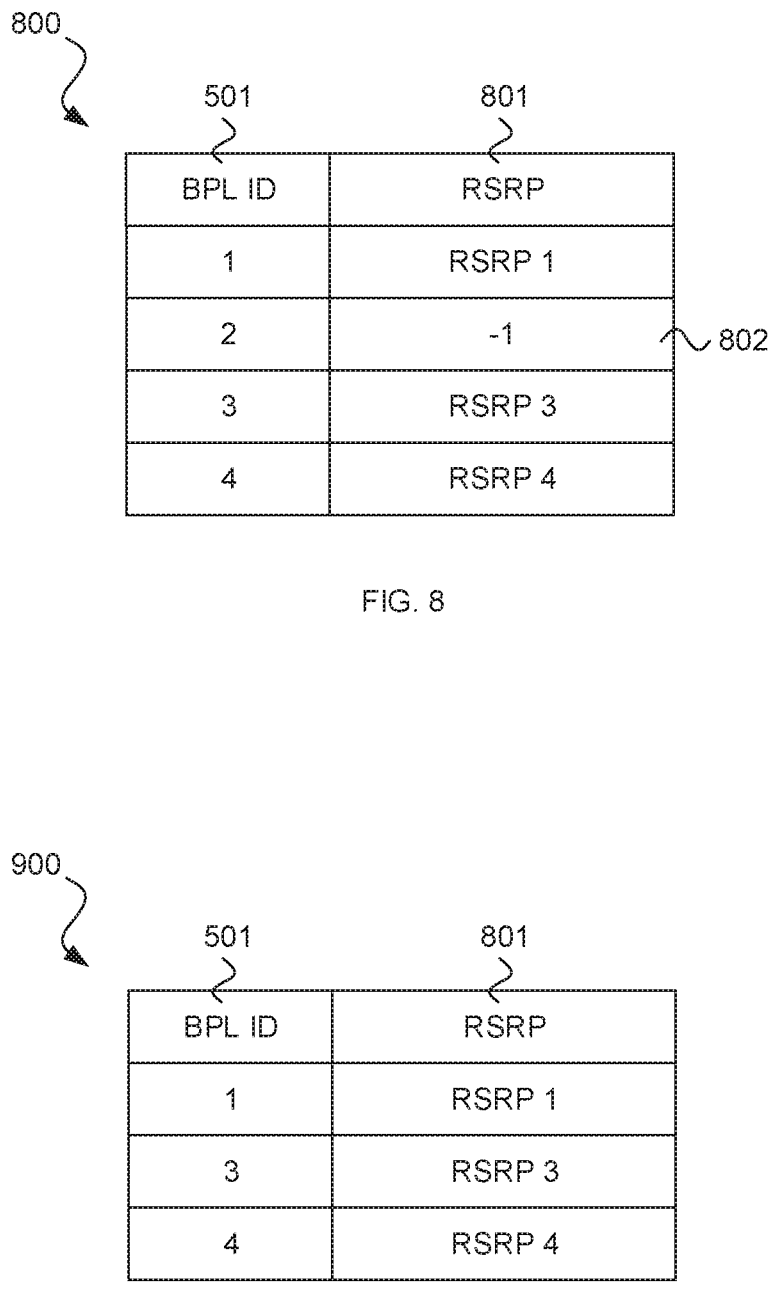

FIG. 8 illustrates a schematic representation of a table of measurement results 800 according to an embodiment. Each row of the table 800 corresponds to a single DL BPL. The first column indicates the ID 501 of the DL BPL and the second column indicates the RSRP measurement result 801. Alternatively, the second column could include measurement results of some other quantity that could be used to assess the link quality, such as BLER. The IDs may, for example, be 1 for TCI [00], 2 for TCI [01], 3 for TCI [10], 4 for TCI [11]. The results 801 may, for example, be RSRP value for BPL ID 1 as RSRP 1, RSRP value for BPL ID 2 as −1, RSRP value for BPL ID 3 as RSRP 3, RSRP value for BPL ID 4 as RSRP 4. These RSRP values can also be represented by coded bits and accordingly, the specific RSRP value can be coded into a specific coded state like a 4-bit state "0000" to represent the specific RSRP value. The beam reports 701_1-701_3 may include a table similar to the table 800. Alternatively, the beam reports 701_1-701_3 may only include the measurement results 801 as a list. In such a situation, the correspondence between the measurement results 801 and the DL BPLs should be implicitly clear to the network device 200. This can be achieved, for example, by sorting the list according to the BPL IDs 501. A failed BPL may be indicated in the table 800 using a specific predetermined value. For example, in FIG. 8, the DL BPL corresponding to ID 2 has failed. Thus, the value −1 802 is used to indicate the failure in the beam report. It can be appreciated that the value −1 is only an example, and any other values or symbols may be used as an indicator of a failed DL BPL. For example, the predetermined value should be such that it can be distinguished from an ordinary measurement result. If multiple DL BPLs have failed, this can be indicated in a single beam report by using the specific value for all of the DL BPLs.

FIG. 9 illustrates a schematic representation of a table of measurement results 900 according to another embodiment. Structure of the table 900 is similar to that presented in FIG. 8. However, instead of indicating a failed DL BPL with a specific measurement value, the failed beam is indicated by omitting the failed DL BPL from the beam report. For example, similar to the case of FIG. 8, in FIG. 9, the DL BPL corresponding to BPL ID 2 has failed. Thus, in the embodiment presented in FIG. 9, the row corresponding to the failed DL BPL has been omitted. When such information is transmitted to the network device 200 in a beam report, the network device 200 can deduce that the DL BPL corresponding to ID 2 has failed even though the beam report is free of an explicit indication of the failed DL BPL. If multiple DL BPLs have failed, this can be indicated in a single beam report by omitting all of the failed DL BPLs from the beam report. In FIG. 9, the ID 501 may be configured so that TCI[00] is 1, TCI[10] is 3, TCI[11] is 4. The results 801 may, for example, be RSRP value for BPL ID 1 as RSRP 1, RSRP value for BPL ID 3 as RSRP 3, RSRP value for BPL ID 4 as RSRP 4, and these RSRP values can also be represented by coded bits and accordingly, the specific RSRP value can be coded into a specific coded state like a 4-bit state "0000" to represent the specific RSRP value.

The functionality described herein can be performed, at least in part, by one or more computer program product components, such as software components. According to an embodiment, the network device 100 and/or the client device 200 include the processor 101, 201 configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), program-specific application products (ASSPs), system-on-a-chip systems (SOCs), complex programmable logic devices (CPLDs), and/or graphics processing units (GPUs).

Any range or device value given herein may be extended or altered without losing the effect sought. Also, any embodiment may be combined with another embodiment unless explicitly disallowed.

It can be understood that the benefits and advantages described above may relate to one embodiment or may relate to several embodiments. The embodiments are not limited to those that solve any or all of the stated problems or those that have any or all of the stated benefits and advantages. It can further be understood that reference to 'an' item may refer to one or more of those items. The term 'and/or' may be used to indicate that one or more of the cases it connects may occur. Both, or more, connected cases may occur, or only either one of the connected cases may occur.

The operations of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

It can be understood that the description of embodiments is given by way of example only and that various modifications may be made by those of ordinary skill in the art. The embodiments and data provide a description of the structure and use of exemplary embodiments. Although various embodiments have been described above with a certain degree of particularity, or with reference to one or more individual embodiments, those of ordinary skill in the art could make numerous alterations to the embodiments without departing from the spirit or scope of this specification.

The invention claimed is:

1. A client device, comprising: a processor, a receiver and a transmitter, the client device configured to:
    monitor, independently, a link quality of each serving downlink (DL) beam pair link (BPL) of the client device;
    detect at least one failed DL BPL based on the monitoring, wherein the at least one failed DL BPL is a subset of the monitored serving DL BPLs;
    choose an uplink (UL) BPL, wherein the chosen UL BPL corresponds to an available serving DL BPL of the monitored serving DL BPLs; and
    transmit a beam report within a predetermined time period from the detection through a non-contention-based channel using the chosen UL BPL, wherein the beam report indicates the at least one failed DL BPL,
    wherein the client device transmits the beam report periodically when the at least one failed DL BPL is detected after transmitting of the latest beam report with surpassing a predetermined threshold time, and
    the client device transmits the beam report as a response to detecting the at least one failed DL BPL when the at least one failed DL BPL is detected within the predetermined threshold time after transmitting of the latest beam report.

2. The client device of claim 1, wherein the chosen UL BPL is a currently applied UL BPL corresponding to a currently applied DL BPL for transmitting a DL control channel, wherein the currently applied DL BPL is one of the monitored serving DL BPLs.

3. The client device of claim 1, wherein the chosen UL BPL corresponds to a first available DL BPL of the monitored serving DL BPLs.

4. The client device of claim 1, wherein the chosen UL BPL corresponds to a DL BPL having a predefined relationship to the failed DL BPL.

5. The client device of claim 4, wherein the beam report is free of an explicit indication of the at least one failed DL BPL.

6. The client device of claim 1, wherein the beam report comprises an identification of the at least one failed DL BPL.

7. The client device of claim 1, wherein the beam report comprises a bitmap, wherein the bitmap indicates the at least one failed DL BPL.

8. The client device of claim 1, wherein the beam report indicates the at least one failed DL BPL using a specific reference signal received power value.

9. The client device of claim 1, wherein the client device is further configured to:
    transmit the beam report when a number of consecutive failures of the at least one failed DL BPL surpasses a predetermined threshold.

10. The client device of claim 9, wherein the client device independently monitors the link quality of each serving DL BPL based on a configuration predefined by the client device, absent a configuration message transmitted by the network device.

11. The client device of claim 10, wherein the configuration predefined by the client device includes the predetermined threshold of the number of consecutive failures of the at least one failed DL BPL.

12. The client device of claim 1, wherein the client device is further configured to:
    exclude the at least one failed DL BPL from the beam report.

13. The client device of claim 1, wherein the non-contention-based channel comprises a physical random access channel (PRACH), a physical uplink control channel (PUCCH), or a physical uplink shared channel (PUSCH).

14. The client device of claim 1, wherein the client device is further configured to:
    perform the monitoring by measuring reference signals to assess the link quality according to each resource configuration against a configured high layer threshold.

15. The client device of claim 1, wherein the client device is further configured to:
    remove the at least one failed DL BPL from a list of the serving DL BPLs.

16. A network device, comprising: a processor, a receiver and a transmitter, and the network device is configured to:
    receive a beam report from a client device through a non-contention-based channel, wherein the beam report indicates at least one failed downlink (DL) beam pair link (BPL) of monitored serving DL BPLs, wherein the at least one failed DL BPL comprises a subset of the monitored serving DL BPLs; and
    remove the at least one failed DL BPL from a list, wherein the list comprises serving DL BPLs of the client device,
    wherein the beam report is received using an uplink (UL) BPL corresponding to an available serving DL BPL for the client device, and
    wherein the beam report is received periodically when the at least one failed DL BPL is detected after transmitting of the latest beam report with surpassing a predetermined threshold time, and
    the beam report is received as a response to detecting the at least one failed DL BPL when the at least one failed DL BPL is detected within the predetermined threshold time after transmitting of the latest beam report.

17. A method for handling failure of a subset of serving beam pair links in wireless radio communication, comprising:
    monitoring, independently, a link quality of each serving downlink (DL) beam pair link (BPL) of a client device;
    detecting at least one failed DL BPL based on the monitoring, wherein the at least one failed DL BPL is a subset of the monitored serving DL BPLs;

choosing an uplink (UL) BPL, wherein the chosen UL BPL corresponds to an available serving DL BPL of the monitored serving DL BPLs; and transmitting a beam report within a predetermined time period from the detection through a non-contention-based channel using the chosen UL BPL, wherein the beam report indicates the at least one failed DL BPL, wherein the client device transmits the beam report periodically when the at least one failed DL BPL is detected after transmitting of the latest beam report with surpassing a predetermined threshold time, and the client device transmits the beam report as a response to detecting the at least one failed DL BPL when the at least one failed DL BPL is detected within the predetermined threshold time after transmitting of the latest beam report.

* * * * *